US010971348B2

(12) United States Patent
Mullen

(10) Patent No.: US 10,971,348 B2
(45) Date of Patent: Apr. 6, 2021

(54) APPARATUS FOR DELIVERING REAGENT IONS TO A MASS SPECTROMETER

(71) Applicant: Thermo Finnigan LLC, San Jose, CA (US)

(72) Inventor: Christopher Mullen, Menlo Park, CA (US)

(73) Assignee: Thermo Finnigan, San Jose, CA (US)

( * ) Notice: Subject to any disclaimer, the term of this patent is extended or adjusted under 35 U.S.C. 154(b) by 344 days.

(21) Appl. No.: 16/032,723

(22) Filed: Jul. 11, 2018

(65) Prior Publication Data

US 2019/0019663 A1 Jan. 17, 2019

Related U.S. Application Data

(60) Provisional application No. 62/531,104, filed on Jul. 11, 2017.

(51) Int. Cl.

| | |
|---|---|
| ***H01J 49/26*** | (2006.01) |
| ***G01N 35/00*** | (2006.01) |
| ***H01J 49/10*** | (2006.01) |
| ***H01J 49/04*** | (2006.01) |
| ***H01J 49/00*** | (2006.01) |

(52) U.S. Cl.

CPC ........ *H01J 49/107* (2013.01); *H01J 49/0072* (2013.01); *H01J 49/0468* (2013.01); *H01J 49/0495* (2013.01); *H01J 49/26* (2013.01)

(58) Field of Classification Search

CPC .. H01J 49/107; H01J 49/0072; H01J 49/0468; H01J 49/0495; H01J 49/26; H01J 49/10; H01J 49/04; G01N 35/00

See application file for complete search history.

(56) References Cited

U.S. PATENT DOCUMENTS

| | | | | |
|---|---|---|---|---|
| 2006/0255261 A1* | 11/2006 | Whitehouse | ........ | H01J 49/0431 250/288 |
| 2007/0187589 A1* | 8/2007 | Cooks | ..................... | H01J 49/14 250/288 |
| 2013/0140453 A1* | 6/2013 | Verenchikov | ........... | H01J 49/10 250/282 |
| 2015/0008312 A1* | 1/2015 | Campbell | ............ | H01J 49/107 250/282 |
| 2017/0092475 A1* | 3/2017 | Green | ................. | H01J 49/0072 |
| 2017/0205424 A1* | 7/2017 | McGee | ............... | H01J 49/0031 |

* cited by examiner

*Primary Examiner* — Brian J. Sines

(57) ABSTRACT

Disclosed herein is an apparatus for supplying reagent ions, for example ETD or PTR reagent ions, to a mass spectrometer. The apparatus includes a reagent material reservoir, coupled to a carrier gas supply, which delivers an entrained reagent vapor flow to an inlet of a mixing junction through a first flow restrictor. A control gas flow of carrier gas is delivered to another inlet of the mixing junction via a variable pressure regulator and a second flow restrictor. The outlet of the mixing junction is coupled via a third flow restrictor and a reagent transfer junction to an inlet of an ionizer, such as a glow-discharge ionizer. By dynamic adjustment of the output pressure of the variable pressure regulator, the flow rate of reagent vapor may be controlled over a broad range, even for reagent materials of relatively high volatility.

15 Claims, 2 Drawing Sheets

APPARATUS FOR DELIVERING REAGENT IONS TO A MASS SPECTROMETER

CROSS-REFERENCE TO RELATED APPLICATION

This application claims the priority benefit under 35 U.S.C. § 119(e)(1) of U.S. provisional patent application Ser. No. 62/531,104 for “Apparatus and Method of Delivering Reagent Vapor to a Reagent Ion Source”, filed Jul. 11, 2017, the disclosure of which is incorporated by reference in its entirety.

FIELD OF THE INVENTION

The present invention relates generally to ion-ion reactions employed in mass spectrometry analysis, and more specifically to an apparatus and method for controlling the flow of reagent vapor to an ionizer.

BACKGROUND

Mass spectrometry has been extensively employed for ion-ion chemistry experiments, in which analyte ions produced from a sample are reacted with reagent ions of opposite polarity. Ion-ion reactions useful for mass spectrometry analysis include proton transfer reaction (PTR), which reduces the charge states of multiply-charged analyte cations, and electron transfer dissociation (ETD), in which analyte cations (e.g., peptide ions) are fragmented by reaction with radical anions. Ion-ion experiments require utilization of a reagent ion source for supplying the reagent ions in a controlled manner to the reaction zone of the mass spectrometer. Typically, reagent ions are produced by delivering an entrained flow of reagent molecules to an ionizer, such as a glow-discharge ionizer (as used herein, the term “ionizer” refers to a structure, such as a glow-discharge cell, in which ionization of the reagent molecules occurs, usually via interaction of the molecules with a source of electrons, radiation, or other ionizing agent). In cases where the reagent material is in condensed (i.e., liquid or solid) phase at or near room temperature, an entrained reagent vapor flow may be formed by passing a carrier gas through a reservoir containing a volume of the reagent material. In existing systems, the rate at which reagent vapor molecules are supplied to the ionizer, and consequently the number of reagent ions produced, is controlled by adjusting the flow rate of carrier gas into the reservoir and/or by adjusting, via heating and/or cooling devices, the temperature of the reagent material. For certain types of ion-ion experiments, for example ETD preceded or followed by PTR, it may be necessary to employ two or more separate reagent sources to supply the different reagents to the reaction zone in a concurrent or sequential manner.

For certain reagent materials, particularly those having relatively high vapor pressures, it may be difficult or impossible to supply reagent vapor using existing systems in a controlled and stable manner over a full range of desired flow rates. If too many or too few reagent ions are generated, the results produced by the ion-ion experiments may be adversely affected. Furthermore, it has been observed that the presence of reagent vapor in excessively high concentrations in certain types of ionizers may cause operational problems, such as premature failure of thermionic filaments.

Against this background, there remains a need in the art for an apparatus for delivering reagent ions to a mass spectrometer that provides improved control of reagent vapor flow rate to enable operation over a greater range of flow rates and/or for reagent materials of relatively high volatility.

SUMMARY

In accordance with an illustrative embodiment, an apparatus is disclosed for delivering reagent ions to a mass spectrometer that utilizes a carrier gas flow supplied at controllable pressure to a mixing junction to regulate the rate at which reagent vapor is provided to an ionizer. The apparatus includes a carrier gas (e.g., purified nitrogen) supply coupled to a first reagent reservoir that holds a volume of first reagent material in condensed phase. First reagent vapor, entrained in a carrier gas flow, is delivered from the first reagent reservoir to a first inlet of a mixing junction through a first flow restrictor. The carrier gas supply is also coupled to a first variable pressure regulator, which delivers a flow of carrier gas to a second inlet of the mixing junction through a second flow restrictor. An outlet of the mixing junction is coupled to an inlet of a reagent transfer junction through a third flow restrictor. The outlet of the reagent transfer junction is coupled to an inlet of an ionizer. By adjusting the output pressure of the first variable pressure regulator, for example via an electronic controller, the rate at which the first reagent vapor is supplied to the ionizer may be finely and reliably controlled, even for reagent materials having relatively high vapor pressures.

In another embodiment that enables separately regulated delivery of two different reagent vapors (e.g., ETD and PTR reagents) to the ionization source, a second reagent reservoir, holding a volume of second reagent material, is coupled to the carrier gas supply. Entrained second reagent vapor is delivered to an inlet of a reagent transfer junction. The apparatus incorporates a second variable pressure regulator, coupled to the carrier gas supply, which delivers gas flow to yet another inlet of the reagent transfer junction through a fourth flow restrictor. The combined first and second reagent vapor flows are directed to the reagent ionizer through an outlet of the reagent transfer junction.

According to more specific embodiments, the first reagent material may be a PTR reagent, for example a perfluorinated compound such as perfluoroperhydrophenanthrene, perfluormethyldecalin or perfluorodecalin. The first or second reagent material may be an ETD reagent, such as fluoranthene or azulene. The first reagent reservoir and/or second reagent reservoir may include a temperature control device for maintaining its temperature at a desired setpoint. The first reagent material may have a vapor pressure of between 1 to 50 Torr at 25° C. The flow restrictors may each take the form of a capillary constructed from PEEKsil™ (fused silica sheathed in polyether ether ketone polymer) or fused silica tubing. The apparatus may further include one or more electronic controllers for setting the output pressure of the first and/or second variable pressure regulators. The ionizer may be a glow-discharge ionizer.

DETAILED DESCRIPTION OF EMBODIMENTS

Figure 1:
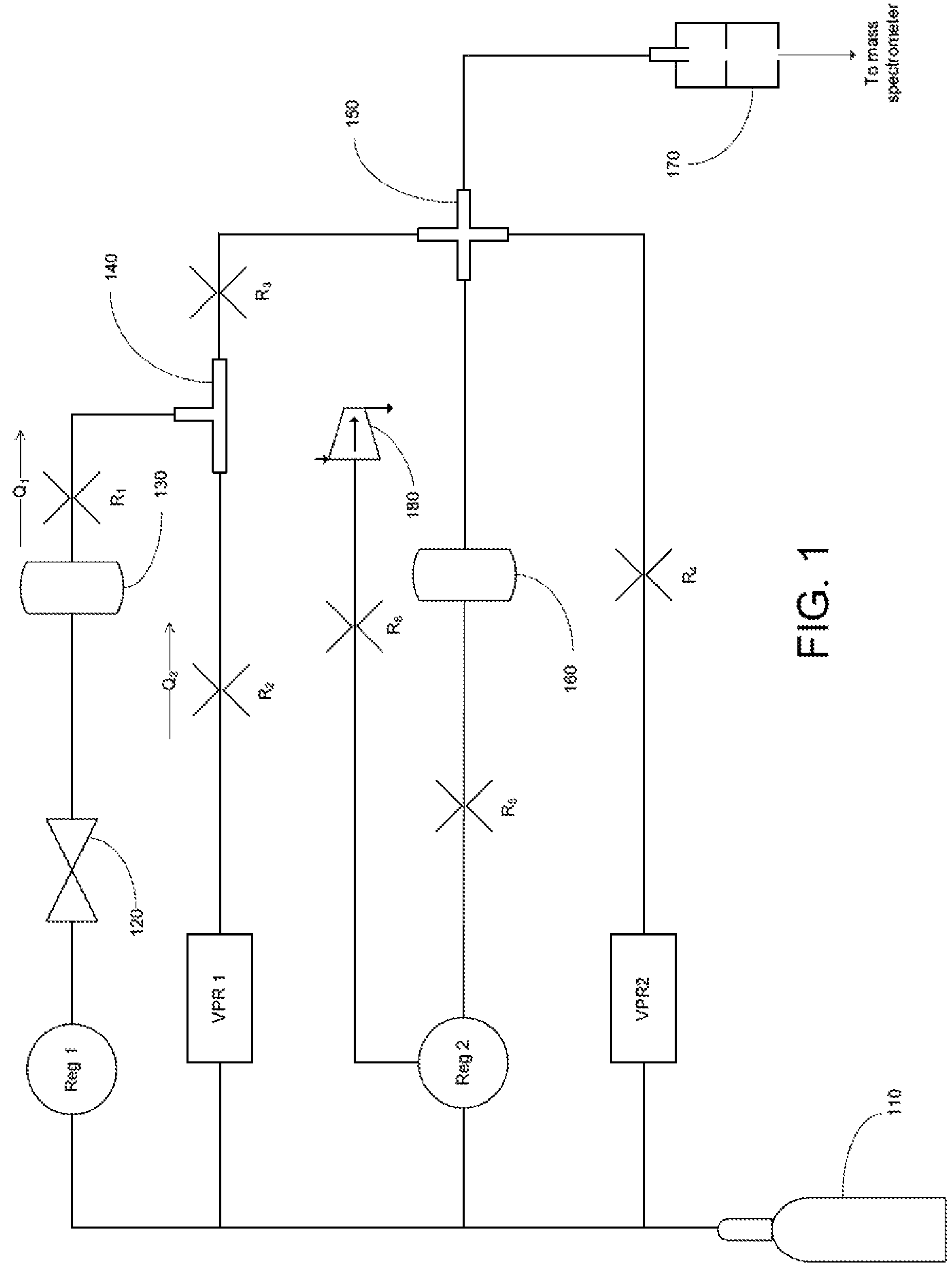
FIG. 1 is a symbolic diagram of an apparatus for delivering reagent ions to a mass spectrometer, in accordance with an illustrative embodiment of the invention.

FIG. 1 symbolically depicts components of an apparatus for delivering reagent ions to a mass spectrometer, constructed according to an illustrative embodiment of the present invention. The apparatus includes a carrier gas supply 110, which may take the form of a cylinder of a purified inert gas such as nitrogen, helium or argon. Carrier gas supply 110 may be provided with a pressure regulator to deliver gas at a fixed pressure, e.g., at 50 pounds/square inch gauge (50 psig). Carrier gas supply 110 is coupled to a first reagent reservoir 130 via a pressure regulator (labeled Reg 1 in the drawing), which acts to reduce the carrier gas pressure to a fixed value, for example 5 or 10 psig. A shut-off valve 120 may be placed upstream of first reagent reservoir 130 to enable the flow of carrier gas to be turned off. First reagent reservoir 130, which may be in the form of a sealed (against ambient) vial, contains a volume of a first reagent material from which reagent ions are generated to perform the desired ion-ion experiments. In one example, reservoir 130 holds a volume of a PTR reagent material for producing PTR reagent ions for charge reduction of multiply-charged analyte cations. Without limitation, PTR reagent material may be a perfluorinated compound such as perfluoroperhydrophenanthrene, perfluormethyldecalin or perfluorodecalin, or other compound known to produce PTR ions such as benzoic acid. In another example, reservoir 130 holds a volume of an ETD reagent material, such as azulene. In any case, the first reagent material is present within reservoir 130 in condensed-phase (i.e., liquid or solid) form. The reagent vapor pressure within reservoir 130 will depend on the temperature at which the reagent material is maintained. According to an exemplary implementation, the reagent material has a vapor pressure of between 1 to 50 Torr at 25° C. To control the vapor pressure, reservoir 130 may be provided with a temperature control device, such as a heater or cooler with an associated control feedback loop to heat and/or cool the reagent material to a desired temperature setpoint. In certain implementations, the temperature control device may include a Peltier cooling element for cooling the reagent material, or a jacket heater, cartridge heater, immersion heater, oven, or infra-red radiation source for heating the reagent material.

An outlet of reservoir 130 is connected to an inlet of first flow restrictor R1. As used herein, the term "flow restrictor" (alternatively referred to as a flow limiter) denotes a device that presents resistance to fluid passing through it and thereby restricts fluid flow. In one example, flow restrictor R1 takes the form of a capillary constructed from PEEKsil (fused silica sheathed in polyether ether ketone polymer) having an inner diameter (ID) of 25 μm and a length of 100 cm. In flow restrictors of this type, the fluid flow rate is proportional to the pressure drop across the flow restrictor and the ID of the capillary raised to the fourth power ($ID^4$). Other types of flow restrictors configured to limit gas flow (e.g., orifice plates, porous plugs) may be substituted for the capillary. The outlet of first flow restrictor R1 is connected to an inlet of a mixing junction 140, which is a structure having a plurality of inlets in communication with an outlet, and may take the form of a tee fitting having first and second inlets and a single outlet.

Carrier gas supply 110 is further coupled to a first variable pressure regulator, labeled as VPR1 in FIG. 1. The variable pressure regulator is a device that provides a dynamically adjustable output pressure over a range of pressures, with the output pressure being set in accordance with operator or computer-generated input. The variable pressure regulator will typically include an electronic controller that communicates with a pressure sensor to adjust the state of a proportional control valve. One example of a commercially available device that may be used as the variable pressure regulator is the Parker Model 415 electronic pressure regulator (Parker Hannafin Corporation, Hollis, N.H.), which is capable of adjusting output pressure within a continuous range of pressures (e.g., 0-50 psig). The variable pressure regulator VPR1 has its outlet coupled to an inlet of second flow restrictor R2, which may take the form of a PEEKsil capillary having an ID of 50 μm and a length of 20 cm. Again, other types of flow restrictors may be used in place of the capillary, or the capillaries employed may have different internal and/or external dimensions. The outlet of R2 is coupled to another inlet of mixing junction 140. Mixing junction combines the flows of entrained reagent vapor through first flow restrictor R1 (indicated as Q1 in FIG. 1, and referred to below as the "regulated flow") and carrier gas through second flow restrictor R2 (indicated as Q2 and referred to below as the "control flow").

An outlet of mixing junction 140 is coupled via third flow restrictor R3 to an inlet of reagent transfer junction 150. Reagent transfer junction 150 is a structure having a plurality of inlets in fluid communication with an outlet. Reagent transfer junction may take the form, for example, of a cross fitting. Third flow restrictor R3 may be a PEEKsil capillary having an ID of 50 μm and a length of 20 cm (again, a different type of structure having suitable flow resistance may be substituted for the capillary). An outlet of reagent transfer junction is coupled to an inlet of ionizer 170, which (as described below) operates to ionize the first reagent vapor to produce first reagent ions.

Figure 2:
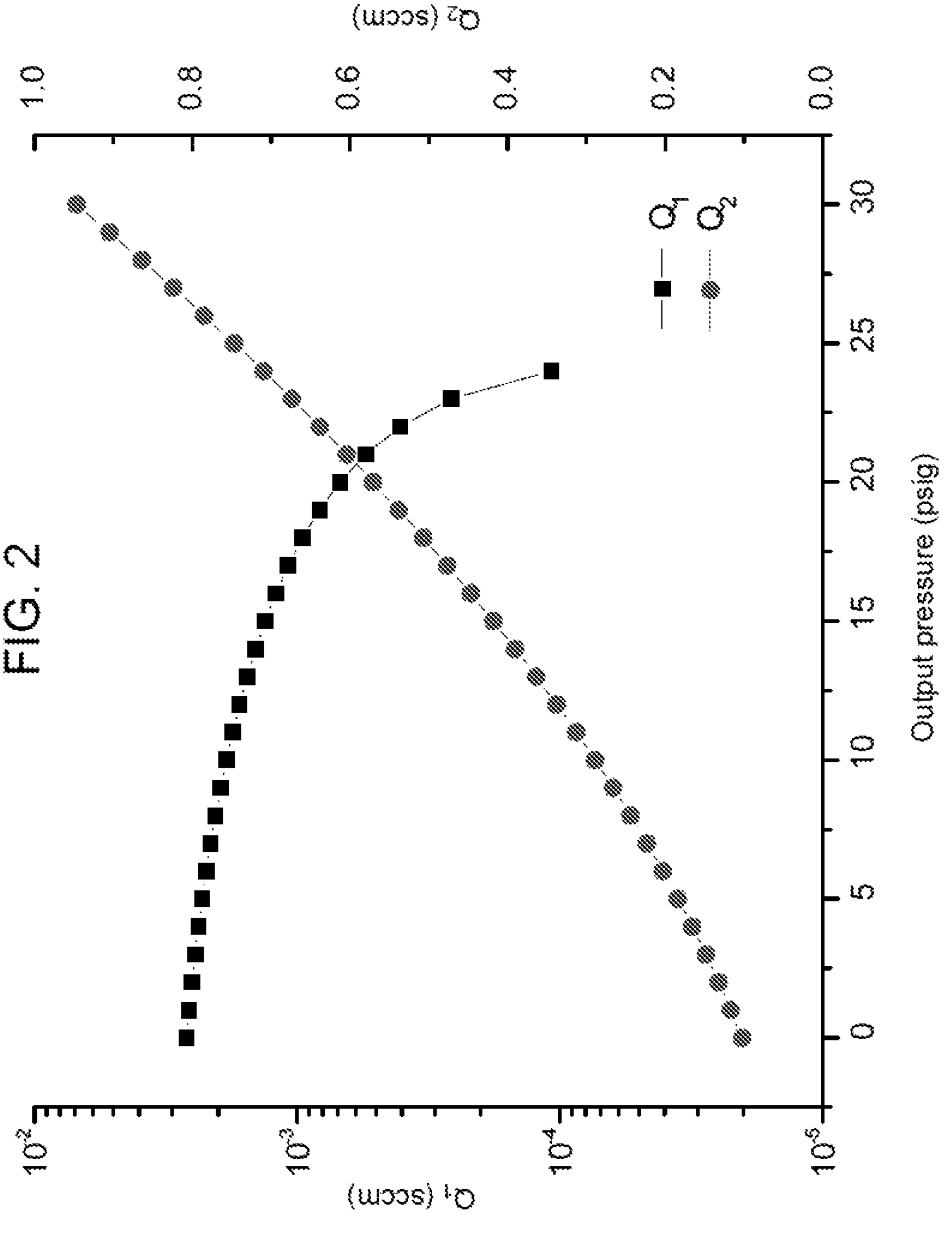
FIG. 2 is a graph showing the variation of rates of entrained reagent vapor flow (Q1) and control flow (Q2) with the output pressure of the first variable pressure regulator.

In the above-described arrangement, the regulated flow rate Q1 of entrained reagent vapor through R1 is controlled to the desired value by adjusting the output pressure of first variable pressure regulator VPR 1; reducing the output pressure increases Q1 while increasing the output pressure reduces Q1. The variation with output pressure over the range of 0-25 psig of calculated Q1 and Q2 rates for the system described above is depicted in FIG. 2. Notably, the regulated (entrained reagent vapor) flow rate Q1 may be controllably varied over an approximately thirty-fold range, from about $10^{-4}$ sccm to about $3*10^{-3}$ sccm.

Ionizer 170 may be a glow-discharge ionizer, of the type described in U.S. Pat. No. 8,119,984 ("Method and Apparatus for Generation of Reagent Ions in a Mass Spectrometer" by Shabanowitz et al., the disclosure of which is incorporated by reference in its entirety). In a glow-discharge ionizer, the reagent ions are formed by passing the reagent vapor through an ionization volume in which a low-current electrical discharge is established between opposing electrodes. Other types of ionizers that may be suitable for use in the apparatus include chemical ionizers and electron impact ionizers. The ionization volume may be maintained at a low-vacuum pressure, for example between 0.5 and 10 Torr. The reagent ions generated by ionizer 170 are transported to a reaction zone of the mass spectrometer (which may be located within an interior volume of an ion trap or collision cell, as known in the art) via ion optics such as lenses and radio-frequency multipole, where they react under controlled conditions with analyte ions, such as protein or peptide cations.

In certain implementations, the apparatus may be configured to deliver (in a sequential or concurrent manner) two different reagents to ionizer 170, for example a PTR reagent and an ETD reagent. To achieve this functionality, the apparatus may include a second reagent reservoir 160, which contains a volume of a second reagent material in condensed phase form. In the present example, the second reagent material may be fluoranthene, azulene, or other compound capable of producing ETD ions. As with the first reagent reservoir 130, second reagent reservoir 160 may be provided with a temperature control device, having cooling and/or heating elements to maintain the temperature at a desired setpoint and thereby control the vapor pressure of the second reagent material. Second reagent reservoir 160 is coupled to carrier gas supply 110 via a pressure regulator (labeled as Reg 2) and flow restrictor R5. Fixed pressure regulator reduces the carrier gas pressure to a fixed value (e.g., 5 or 10 psig) and regulates the flow rate of entrained second reagent vapor. Flow restrictor R5 may take the form of another PEEKsil capillary having an ID of 25 μm and a length of 10 cm.

An outlet of second reagent reservoir 160 is coupled to an inlet of reagent transfer junction 150. The apparatus of FIG. 1 includes a further flow restrictor R6, which may be a PEEKsil capillary having an ID of 50 μm and a length of 20 cm, which is coupled at its inlet end to the outlet of pressure regulator Reg 2 and at its outlet end to a suitable vacuum pump 180, such as the intermediate drag stage in a multi-stage turbo pump. The additional bypass flow path of carrier gas (it should be understood that the term "carrier gas" may refer to any flow derived from the carrier gas supply, and doesn't require that the carrier gas flow includes any reagent vapor) assists in regulating the flow through flow restrictor R5 and avoid or minimize fluctuations or other instabilities in the flow rate.

A second variable pressure regulator, labeled as VPR2 in FIG. 1, is included to establish the base pressure within ionizer 170 such that its performance is optimized. Similarly to VPR1, VPR2 is a device that provides a dynamically adjustable output pressure over a range of pressures, with the output pressure being set in accordance with operator or computer-generated input, and will typically include an electronic controller that communicates with a pressure sensor to adjust the state of a proportional control valve. The aforementioned Parker Model 415 electronic pressure regulator (Parker Hannafin Corporation, Hollis, N.H.), which is capable of adjusting output pressure within a continuous range of pressures (e.g., 0-50 psig), may also be employed for the second variable pressure regulator. The outlet of VPR2 is coupled to another inlet of reagent transfer junction 150 via flow restrictor R4, which may be a PEEKsil capillary having an ID of 100 μm and a length of 10 cm.

Reagent transfer junction 150 operates to combine the flow exiting mixing junction 140 with the entrained second vapor flow from second reagent reservoir 160 (together with the carrier gas flows passing through flow restrictors R4), and direct the mixed flows to the inlet of ionizer 170, where the first and/or second reagent vapors undergo ionization. The respective flows of the first and second reagent vapors are controlled by appropriate adjustment of variable pressure regulator VPR1 and Reg 2. For certain experiments, it may be preferable or necessary to supply only one of the reagents to ionizer 170 at a time; to effect this condition, one or more cutoff valves (e.g., cutoff valve 120) may be employed to turn off the flow of carrier gas to the reservoir from which reagent vapor flow is undesired.

In addition to performing the function of reacting with analyte ions, the first and/or second reagent ions, having precisely known mass-to-charge ratios, may also be employed for internal mass calibration (i.e., as "lock mass ions") in order to improve the mass accuracy of the peaks identified in the product mass spectra. In alternative implementations, a compound suitable for producing mass calibrant ions may be mixed in with the first and/or second reagent materials held within the reservoirs.

The apparatus described above may offer several advantages when compared to prior art systems, including the ability to finely control entrained reagent vapor flow rates over a broad range, and to facilitate use of reagent materials of relatively high volatilities. Other advantages and benefits of the invention will be apparent to those of ordinary skill in the art.

It should be further noted that, while FIG. 1 and the corresponding text depict and describe the invention in the context of its use for delivering two different reagents to the ionizer, it may be easily adapted for delivery of additional reagents.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An apparatus for delivering reagent ions to a mass spectrometer, comprising:
- a carrier gas supply coupled to a first reagent reservoir, the first reagent reservoir holding a volume of first reagent material in condensed phase;
- a first flow restrictor having an inlet end coupled to the first reagent reservoir;
- a first variable pressure regulator having an inlet coupled to the carrier gas supply;
- a second flow restrictor having an inlet end coupled to an outlet of the first variable pressure regulator;
- a mixing junction having a first inlet coupled to the outlet of the first flow restrictor and a second inlet coupled to the outlet of the second flow restrictor;
- a third flow restrictor having an inlet end coupled to the mixing junction and an outlet end coupled to an inlet of a reagent transfer junction; and
- a reagent ionizer, having an inlet coupled to an outlet of the reagent transfer junction, the reagent ionizer being configured to ionize first reagent vapor received from the reagent transfer junction.

2. The apparatus of claim 1, further comprising:
- a second reagent reservoir, coupled to the carrier gas supply, holding a volume of second reagent material in condensed phase;
- a second variable pressure regulator having an inlet coupled to the carrier gas supply;
- a fourth flow restrictor having an inlet end coupled to an outlet of the second variable pressure regulator and an outlet end coupled to the reagent transfer junction.

3. The apparatus of claim 2, wherein the second reagent reservoir is coupled to the carrier gas supply through a first fixed pressure regulator and a fifth flow restrictor having an inlet end coupled to an outlet of the first fixed pressure regulator and an outlet end coupled to the second reagent reservoir.

4. The apparatus of claim 3, further comprising a sixth flow restrictor having an inlet end coupled to the outlet of the first fixed pressure regulator.

5. The apparatus of claim 1, wherein the first reagent reservoir is coupled to the carrier gas supply through a second fixed pressure regulator.

6. The apparatus of claim 1, further comprising a temperature control device for maintaining the temperature of the first reagent material at a desired setpoint.

7. The apparatus of claim 2, further comprising a temperature control device for maintaining the temperature of the second reagent material at a desired setpoint.

8. The apparatus of claim 1, wherein the first reagent material is a proton transfer reaction (PTR) reagent.

9. The apparatus of claim 8, wherein the PTR reagent is a perfluorinated compound.

10. The apparatus of claim 9, wherein the perfluorinated compound is selected from a group consisting of perfluoroperhydrophenanthrene, perfluormethyldecalin and perfluorodecalin.

11. The apparatus of claim 1, wherein the first reagent material has a vapor pressure of between 1 to 50 Torr at 25° C.

12. The apparatus of claim 2, wherein the second reagent material is an electron transfer dissociation (ETD) reagent.

13. The apparatus of claim 1 wherein the reagent ionizer is selected from a group consisting of a glow discharge ionizer, a chemical ionizer, a thermionic ionizer, and an electron impact ionizer.

14. The apparatus of claim 1, further comprising an electronic controller for setting an output pressure of the first variable pressure regulator.

15. The apparatus of claim 2, further comprising an electronic controller for setting an output pressure of the second variable pressure regulator.

* * * * *